(12) United States Patent
Song

(10) Patent No.: US 12,063,427 B2
(45) Date of Patent: Aug. 13, 2024

(54) SENSOR DRIVING APPARATUS AND CAMERA MODULE

(71) Applicant: LG INNOTEK CO., LTD., Seoul (KR)

(72) Inventor: Yun Sang Song, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 470 days.

(21) Appl. No.: 17/421,639

(22) PCT Filed: Jan. 17, 2020

(86) PCT No.: PCT/KR2020/000869
§ 371 (c)(1),
(2) Date: Jul. 8, 2021

(87) PCT Pub. No.: WO2020/149701
PCT Pub. Date: Jul. 23, 2020

(65) Prior Publication Data
US 2022/0094823 A1    Mar. 24, 2022

(30) Foreign Application Priority Data

Jan. 18, 2019    (KR) .......................... 10-2019-0007000

(51) Int. Cl.
*H04N 23/54*    (2023.01)
*G03B 17/12*    (2021.01)
(Continued)

(52) U.S. Cl.
CPC ............. *H04N 23/54* (2023.01); *G03B 17/12* (2013.01); *H04N 23/55* (2023.01); *G03B 2205/0069* (2013.01)

(58) Field of Classification Search
CPC ................. H04N 23/54; H04N 23/687; G03B 2205/0038
(Continued)

(56) References Cited

U.S. PATENT DOCUMENTS

2008/0225126 A1* 9/2008 Mogamiya ............. H04N 23/68
                                                      348/208.4
2009/0252489 A1   10/2009 Huang et al.
(Continued)

FOREIGN PATENT DOCUMENTS

CN    101573647 A    11/2009
CN    101867722 A    10/2010
(Continued)

OTHER PUBLICATIONS

Office Action dated Jan. 19, 2023 in Chinese Application No. 202080009453.4.
(Continued)

*Primary Examiner* — Anthony J Daniels
(74) *Attorney, Agent, or Firm* — SALIWANCHIK, LLOYD & EISENSCHENK

(57) ABSTRACT

The present embodiment relates to a sensor driving apparatus comprising: a first substrate including a first opening; a support member arranged at a position corresponding to the first opening; a first connector for electrically connecting the support member and the first substrate and elastically supporting the support member; a base coupled to the support member; a second substrate arranged on the base; an image sensor mounted on the second substrate; a second connector which is arranged on the base and electrically connects the second substrate and the first connector; a first driving unit arranged on the first substrate; and a second driving unit arranged on the base and facing the first driving unit.

18 Claims, 7 Drawing Sheets

(51) Int. Cl.
*H04N 23/55* (2023.01)
*H04N 23/68* (2023.01)

(58) Field of Classification Search
USPC .......................................... 348/208.99, 374
See application file for complete search history.

(56) References Cited

U.S. PATENT DOCUMENTS

| | | |
|---|---|---|
| 2010/0208089 A1 | 8/2010 | Chang |
| 2016/0142605 A1 | 5/2016 | Shimizu et al. |
| 2016/0209672 A1 | 7/2016 | Park et al. |
| 2017/0082866 A1* | 3/2017 | Kim .................. H04N 23/687 |
| 2019/0115860 A1* | 4/2019 | Mizukami ................ G03B 3/04 |
| 2019/0219892 A1 | 7/2019 | Park et al. |
| 2020/0036898 A1* | 1/2020 | Kuo ....................... G03B 5/00 |

FOREIGN PATENT DOCUMENTS

| | | |
|---|---|---|
| CN | 104423003 A | 3/2015 |
| CN | 104730678 A | 6/2015 |
| CN | 107688245 A | 2/2018 |
| CN | 109154712 A | 1/2019 |
| JP | 2017-9998 A | 1/2017 |
| KR | 10-2006-0034356 A | 4/2006 |
| KR | 10-0992338 B1 | 11/2010 |
| KR | 10-2017-0082805 A | 7/2017 |
| KR | 10-2018-0067122 A | 6/2018 |
| KR | 10-2018-0114804 A | 10/2018 |

OTHER PUBLICATIONS

International Search Report dated Apr. 23, 2020 in International Application No. PCT/KR2020/000869.
Office Action dated Aug. 25, 2023 in Chinese Application No. 202080009453.4.
Office Action dated Aug. 11, 2023 in Korean Application No. 10-2019-0007000.

* cited by examiner

10

SENSOR DRIVING APPARATUS AND CAMERA MODULE

CROSS-REFERENCE TO RELATED APPLICATIONS

This application is the U.S. national stage application of International Patent Application No. PCT/KR2020/000869, filed Jan. 17, 2020, which claims the benefit under 35 U.S.C. § 119 of Korean Application No. 10-2019-0007000, filed Jan. 18, 2019, the disclosures of each of which are incorporated herein by reference in their entirety.

TECHNICAL FIELD

The present invention relates to a sensor driving apparatus and a camera module.

BACKGROUND ART

The content described below provides background information on the present embodiment, and does not describe the prior art.

As various portable terminals are widely spread and commonly used, and the wireless Internet services have been commercialized, the demands of consumer related to portable terminals have been diversified and various kinds of additional devices have been installed in portable terminals.

Among them, there is a camera module for photographing a subject as a photograph or a moving picture. Meanwhile, in recent camera modules, an auto focus function that automatically adjusts the focus according to the distance of the subject is applied. In addition, a hand shake correction function is applied that inhibits the image from being shaken by the photographer's hand shake.

Meanwhile, various attempts have been made to reduce the size of a sensor driving device applied to a camera module and reduce power consumption for an auto focus function or a hand shake correction function.

DETAILED DESCRIPTION OF THE INVENTION

Technical Subject

The problem to be solved by the present invention is to provide a sensor driving device and a camera module capable of reducing the size of the sensor driving device and reducing power consumption.

Technical Solution

A sensor driving device according to an aspect of the present invention for achieving the above object comprises: a first substrate comprising a first opening; a support member disposed at a position corresponding to the first opening; a first connector for electrically connecting the support member and the first substrate and elastically supporting the support member; a base coupled to the support member; a second substrate disposed on the base; an image sensor mounted on the second substrate; a second connector which is disposed on the base and electrically connects the second substrate and the first connector; a first driving unit disposed on the first substrate; and a second driving unit disposed on the base and facing the first driving unit.

In addition, one end of the first connector is coupled to the support member, and the other end may be coupled to an upper surface of the first substrate.

In addition, the first connector may be bent at least once.

In addition, the first connector may be overlapped with the first substrate at least three times in a direction perpendicular to the optical axis.

In addition, the support member may include: a support portion; a second opening formed in the central region of the support portion and being overlapped with the image sensor in an optical axis direction; an extension portion formed by being extended from a first lateral surface of the support portion and a third lateral surface facing the first lateral surface; and a first protruding portion formed by being extended from a second lateral surface of the support portion and a fourth lateral surface facing the second lateral surface.

In addition, the height of the extension portion is formed larger than the height of the support portion, a space is formed between the extension portion and the first and third lateral surfaces of the support portion, and the first connector may be coupled to an inner lateral surface of the extension portion.

In addition, the base comprises a coupling portion formed on a lateral surface, and the coupling portion may be hook-coupled to the first protruding portion.

In addition, the support portion and the first protruding portion are disposed below the first substrate, and a portion of the extension portion may be overlapped with the first substrate in a direction perpendicular to the optical axis.

In addition, the first driving unit comprises a coil, the second driving unit comprises a magnet, the base comprises a first groove formed on an upper surface, and the coil is disposed on a lower surface of the first substrate, and the magnet may be disposed in the first groove of the base.

In addition, the second connector penetrates through the base, one end of the second connector is electrically connected with the first connector, and the other end may be electrically connected to an upper surface of the second substrate.

In addition, the second connector may be bent at least once above the base and at least once bent below the base.

In addition, the first connector and the second connector may be disposed adjacent to a long side of the image sensor.

In addition, the second substrate may be coupled to a lower surface of the base.

A camera module according to an aspect of the present invention for achieving the above object comprises: a first substrate comprising a first opening; a support member disposed below the first substrate and being overlapped with the first opening in an optical axis direction; a first connector having one end connected to the support member, the other end electrically connected to the first substrate, and elastically supporting the support member; a base coupled to the support member; a second substrate disposed on the base; an image sensor mounted on the second substrate; a second connector disposed on the base and electrically connecting the second substrate and the first connector; a first driving unit disposed on the first substrate; and a second driving unit disposed on the base and facing the first driving unit.

In addition, the lens module may include a lens holder coupled to an upper surface of the first substrate, and a liquid lens unit disposed inside the lens holder.

Advantageous Effects

Through the present embodiment, a sensor driving device and a camera module capable of reducing the size of the sensor driving device and reducing power consumption can be provided.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may also include the plural form unless specifically stated in the phrase, and when described as "at least one (or more than one) among A and B and C", it may include one or more among all possible combinations combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or disposed in "on (above)" or "below (under)" of each component, "on (above)" or "below (under)" means that it comprises not only the case where the two components are directly in contact with, but also the case where one or more other components are formed or disposed between the two components. In addition, when expressed as "on (above)" or "below (under)", the meaning of not only an upward direction but also a downward direction based on one component may be included.

The 'optical axis direction' used below is defined as the optical axis direction of a lens and/or image sensor coupled to the lens driving device. Meanwhile, the 'optical axis direction' may correspond to an 'up-down direction', a 'z-axis direction', and the like.

Hereinafter, the present invention will be described in more detail with reference to the accompanying drawings.

Figure 1:
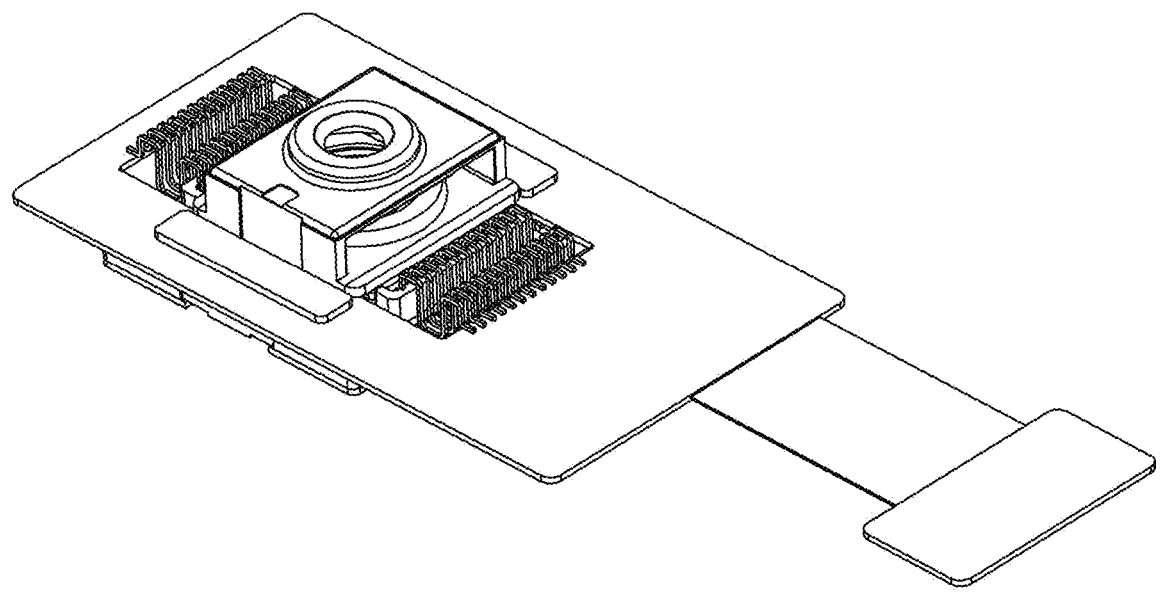
FIG. 1 is a perspective view of a camera module according to an embodiment of the present invention.
Figure 2:
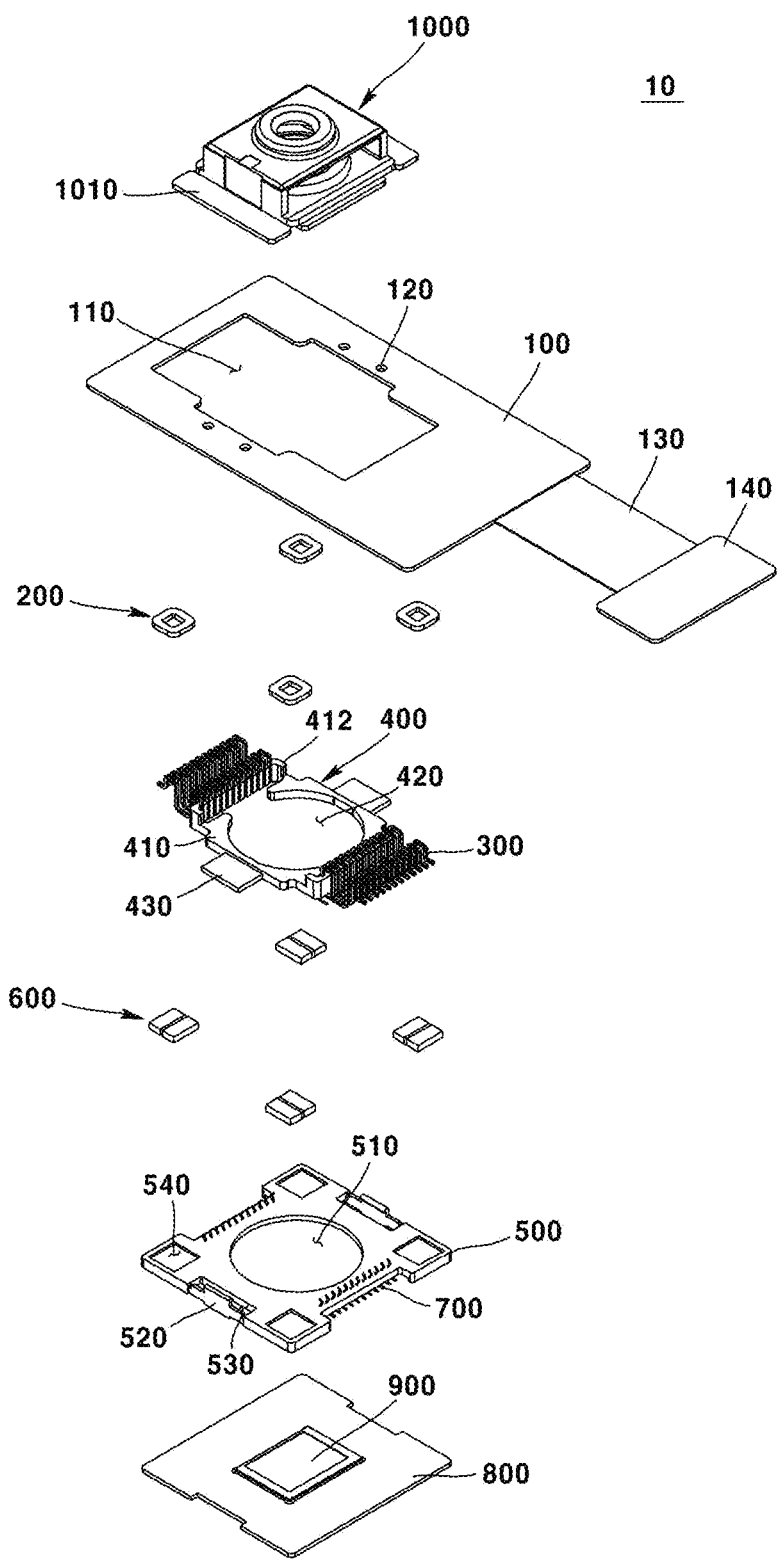
FIG. 2 is an exploded perspective view of a camera module according to an embodiment of the present invention.
Figure 3:
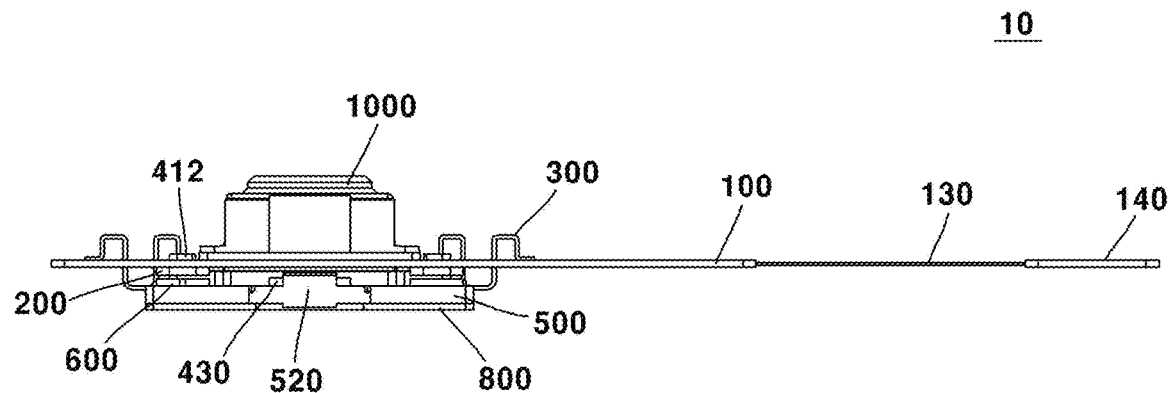
FIG. 3 is a front view of a camera module according to an embodiment of the present invention.
Figure 4:
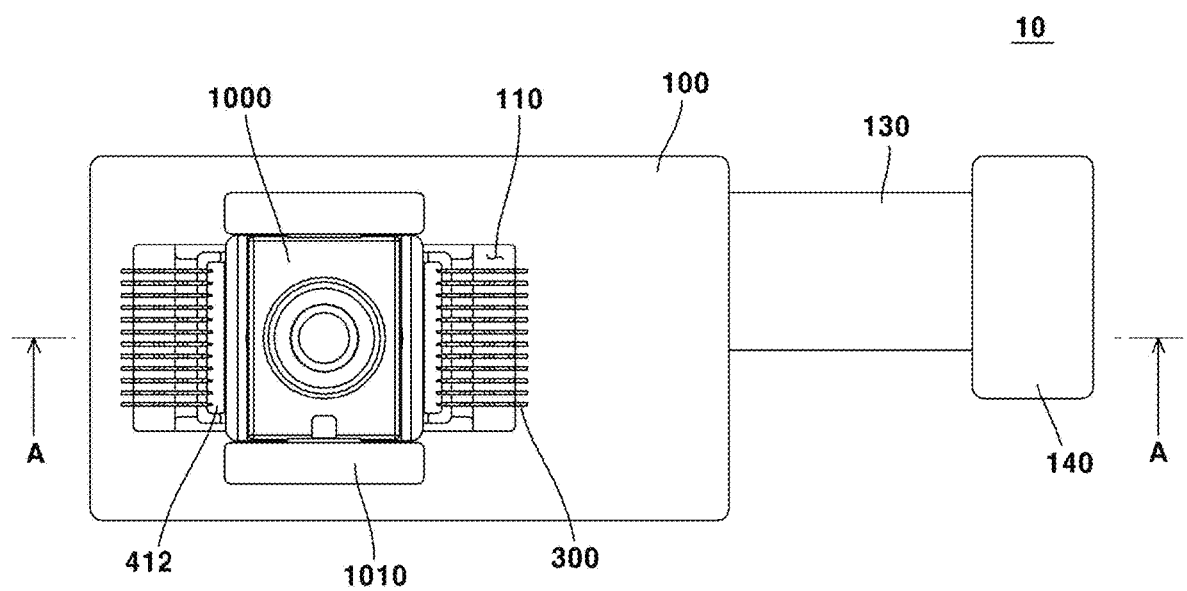
FIG. 4 is a plan view of a camera module according to an embodiment of the present invention.
Figure 5:
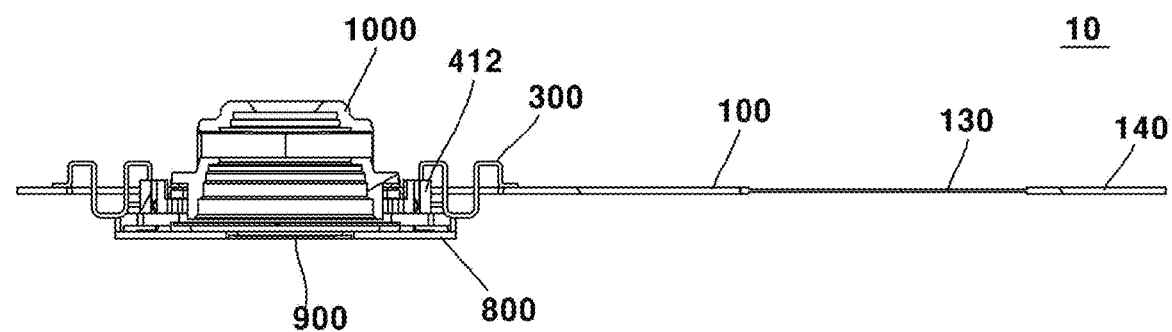
FIG. 5 is a side view of a camera module according to an embodiment of the present invention.
Figure 6:
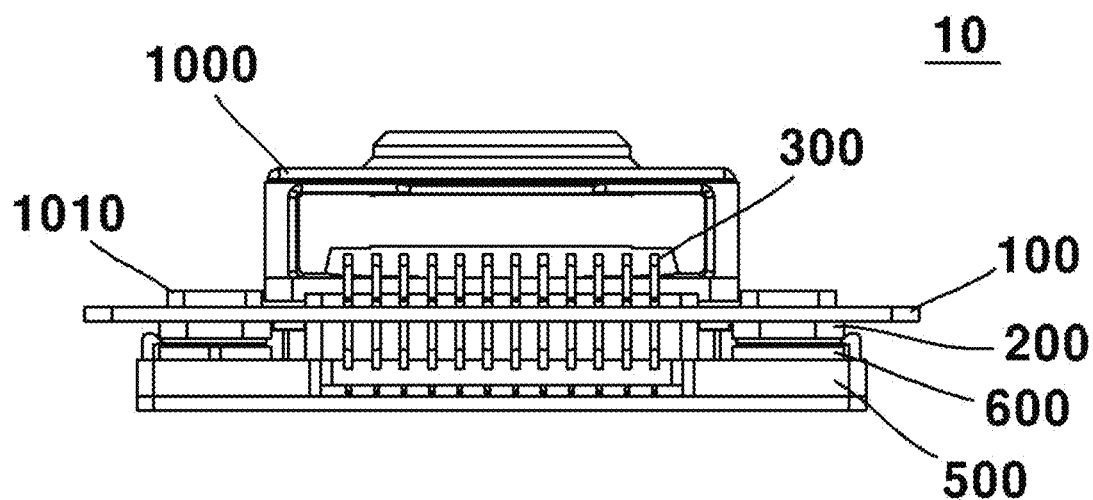
FIG. 6 is a cross-sectional view taken along line A-A' of FIG. 4.
Figure 7:
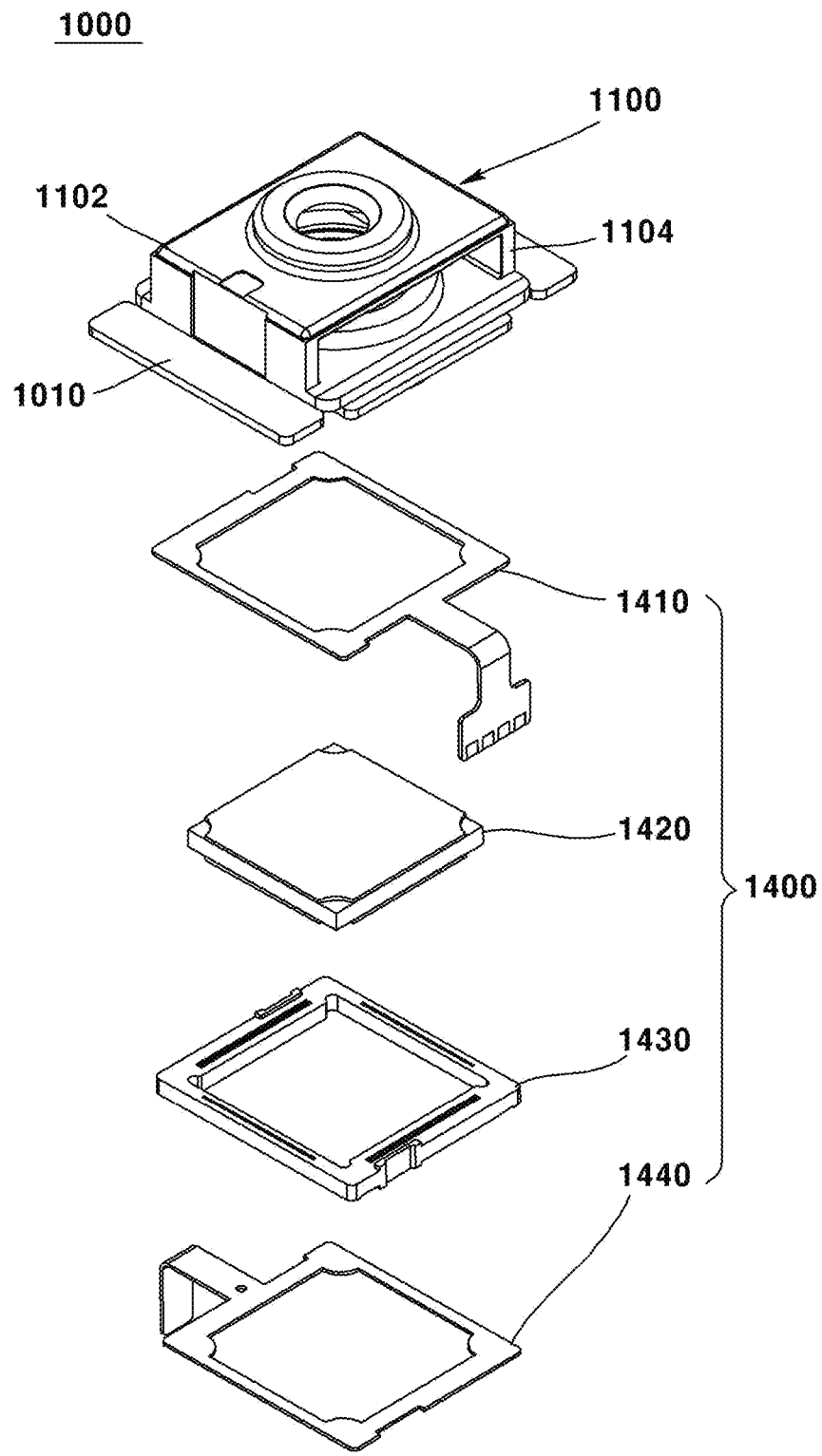
FIG. 7 is an exploded perspective view of a lens module according to an embodiment of the present invention.

FIG. 1 is a perspective view of a camera module according to an embodiment of the present invention. FIG. 2 is an exploded perspective view of a camera module according to an embodiment of the present invention. FIG. 3 is a front view of a camera module according to an embodiment of the present invention. FIG. 4 is a plan view of a camera module according to an embodiment of the present invention. FIG. 5 is a side view of a camera module according to an embodiment of the present invention. FIG. 6 is a cross-sectional view taken along line A-A' of FIG. 4. FIG. 7 is an exploded perspective view of a lens module according to an embodiment of the present invention.

Referring to FIGS. 1 to 7, the camera module 10 according to an embodiment of the present invention may include a first substrate 100, a first driving unit 200, a first connector 300, and a support member 400, a base 500, a second driving unit 600, a second connector 700, a second substrate 800, an image sensor 900, and a lens module 1000, however, it may be implemented excluding some of the configurations, and does not exclude additional configurations other than these. In addition, the camera module 10 according to an embodiment of the present invention may include a sensor driving device. The sensor driving device according to an embodiment of the present invention may include a first substrate 100, a first driving unit 200, a first connector 300, a support member 400, a base 500, a second driving unit 600, the second connector 700, the second substrate 800, and an image sensor 900, but may be implemented excluding some of the configurations, but it does not exclude additional configurations other than these. In addition, the camera module 10 may be included in an optical device. The optical device may include a housing that mounts at least one of a camera module 10, a display unit, a communication module, a memory storage unit, and a battery.

The camera module 10 may include a first substrate 100. The first substrate 100 may be electrically connected to the first connector 300. The first substrate 100 may include a first opening 110, a first hole 120, a flexible printed circuit board (FPCB) 130, and a third substrate 140. The first substrate 100 may be formed of a rigid flexible printed circuit board (RFPCB) comprising the FPCB 130. The FPCB 130 may be bent as required by the space in which the camera module 10 is mounted. The first opening 110 may be formed in a rectangular shape. The first hole 120 may be disposed adjacent to the long side of the first opening 110. Two first holes 120 may be disposed spaced apart from each other on one side of the long side of the first opening 110, and two may be disposed spaced apart from each other on the other side. A configuration such as an external connector electrically connected to an external power source or other device (e.g., an application processor) may be mounted on the third substrate 140. The first opening 110 may include an aperture. The first opening 110 may include a hole.

A lens module 1000 may be disposed on the first substrate 100. The lens module 1000 may be coupled to an upper surface of the first substrate 100. A second protruding portion 1010 of the lens module 1000 may be coupled to the upper surface of the first substrate 100. The second protruding portion 1010 of the lens module 1000 may be disposed in a region among the upper surface of the first substrate 100 adjacent to the long side of the first opening 110. The second protruding portion 1010 of the lens module 1000 may be coupled to the first hole 120 of the first substrate 100. For example, a protrusion formed in the second protruding portion 1010 of the lens module 1000 may be inserted into the first hole 120 of the first substrate 100. Unlike this, the second protruding portion 1010 of the lens module 1000 may be adhered or fused through the first hole 120 of the first substrate 100.

The first driving unit 200 may be disposed on the first substrate 100. The first driving unit 200 may be coupled to a lower surface of the first substrate 100. The first driving unit 200 may be disposed in a region among the lower surface of the first substrate 100 adjacent to the first opening 110. The first driving unit 200 may be disposed in a region among the lower surface of the first substrate 100 adjacent to the long side of the first opening 110.

The first connector 300 may be coupled to the first substrate 100. The first connector 300 may be coupled to a region among the first substrate 100 adjacent to the short side of the first opening 110. The first substrate 100 may be electrically connected to the first connector 300. The first connector 300 may be disposed on an upper surface of the first substrate 100.

A support member 400 may be disposed on the first substrate 100. The support member 400 may be disposed below the first substrate 100. The first opening 110 of the first substrate 100 may be overlapped with the support member 400 in the optical axis direction. A first protruding portion 340 of the support member 400 may be disposed on a lower surface of the first substrate 100. The lower surface of the first substrate 100 may be spaced apart from the first protruding portion 340 of the support member 400.

The camera module 10 may include a first driving unit 200. The first driving unit 200 may be disposed on the first substrate 100. The first driving unit 200 may be coupled to the lower surface of the first substrate 100. The first driving unit 200 may be coupled to a region among the lower surface of the first substrate 100 adjacent to the first opening 110. The first driving unit 200 may face the second driving unit 600. The first driving unit 200 may move the base 500 through an electromagnetic interaction with the second driving unit 600. The first driving unit 200 may include a plurality of first driving units 200. The first driving unit 200 may include four first driving units 200. The two first driving units 200 are disposed adjacent to one side of the long side of the first opening 110 among the lower surfaces of the first substrate 100, and the remaining two first driving units 200 may be disposed adjacent to the other side of the long side of the first opening 110 among the lower surface of the first substrate 100. The first driving unit 200 may include a coil. The first driving unit 200 may be electrically connected to the first substrate 100 to receive current. When current is supplied to the first driving unit 200, electromagnetic interaction with the second driving unit 600 may become possible.

The camera module 10 may include a first connector 300. The first connector 300 may movably connect the support member 400 to the first substrate 100. The first connector 300 may be electrically connected to the first substrate 100. One end of the first connector 300 may be coupled to an upper surface of the first substrate 100. One end of the first connector 300 may be fixed to a region adjacent to the short side of the first opening 110 of the upper surface of the first substrate 100. The other end of the first connector 300 may be coupled to the support member 400. The other end of the first connector 300 may be fixed to an inner surface of an extension portion 412 of the support member 400. In this case, the extension portion 412 may be a side wall portion. The first connector 300 may be formed of an elastic material. The first connector 300 may elastically support the support member 400. The first connector 300 may be formed of an electrically conductive material. The first connector 300 may be electrically connected to the second connector 700. When the base 500 is moved by the interaction between the first driving unit 200 and the second driving unit 600, the first connector 300 can elastically support the base 500 through the connection with the second connector 700.

At least a portion of the first connector 300 may be bent. At least a portion of the first connector 300 may be bent within the first opening 110. In an embodiment of the present invention, the first connector 300 is bent 7 times as an example, but the number of bending of the first connector 300 is not limited thereto. The first connector 300 may be overlapped with the first substrate 100 in a direction perpendicular to the optical axis direction at least three times. In one embodiment of the present invention, the first connector 300 is overlapped with the first substrate 100 three times in a direction perpendicular to the optical axis, but the number of overlaps is not limited thereto and may be variously changed. Through this, the efficiency of elastically supporting the movement of the base 500 connected to the second connector 700 may be improved.

The first connector 300 may include a plurality of first connection terminals. The plurality of first connection terminals may be disposed to be spaced apart from one another. A second connection terminal of the second connector 700 may be disposed between the plurality of first connection terminals. Each of the plurality of first connection terminals may be electrically connected to each of the plurality of second connection terminals of the second connector 700, and may elastically support each of the plurality of second connection terminals of the second connector 700. Some of the plurality of first connection terminals are disposed adjacent to one side of the short side of the first opening 110 among the upper surfaces of the first substrate 100, and the rest may be disposed adjacent to the other side of the short side of first opening 110 among the upper surfaces of the first substrate 100. Some of the plurality of first connection terminals and the rest of the plurality of first connection terminals are formed in a shape corresponding to each other, are disposed at positions corresponding to each other with respect to the support member 400, and may be formed in the same number as each other.

The camera module 10 may include a support member 400. The support member 400 may be disposed below the first substrate 100. The support member 400 may be overlapped with the first opening 110 of the first substrate 100 in the optical axis direction. The support member 400 may be elastically supported by the first connector 300. The support member 400 may be coupled to the base 500. The support member 400 may include a support portion 410, a second opening 420, an extension portion 412, and a first protruding portion 430.

The support portion 410 may be in the shape of a square plate in which the second opening 420 is formed. The size of the support portion 410 may be smaller than the size of the base 500 and the first opening 110. The support portion 410 may be overlapped with the first opening 110 of the first substrate 100 in the optical axis direction. The support portion 410 may be disposed below the first opening 110 of the first substrate 100.

The second opening 420 may be formed in the central region of the support portion 410. The second opening 420 may be overlapped with the image sensor 900, the first opening 110, and a third opening 510 in the optical axis direction. The second opening 420 may be formed in a circular shape, but is not limited thereto and may be variously changed. The second opening 420 may include an opening. The second opening 420 may include a hole.

The extension portion 412 may be formed to extend outwardly from a first lateral surface of the support portion 410 and a third lateral surface opposite to the first lateral surface. The height of the extension portion 412 may be greater than the height of the support portion 410. A space may be formed between the extension portion 412 and the first lateral surface and the third lateral surface of the support portion 410. The other end of the first connector 300 may be disposed in a space formed between the extension portion 412 and the first lateral surface and the third lateral surface of the support portion 410. The other end of the first connector 300 may be coupled to an inner surface of the extension portion 412 facing the support portion 410. At least a portion of the extension portion 412 may be overlapped with the first substrate 100 in a direction perpendicular to the optical axis.

The first protruding portion 430 may be formed by being extended from a second lateral surface of the support portion 410 and a fourth lateral surface facing the second lateral surface. The height of the first protruding portion 430 may be smaller than the height of the support portion 410. The first protruding portion 430 may have a square plate shape. The base 500 may be coupled to the first protruding portion 430. The coupling portion 520 of the base 500 may be coupled to the first protruding portion 430. The coupling portion 520 of the base 500 may be hook-coupled to the first protruding portion 430. The first protruding portion 430 may be disposed below the first substrate 100. At least a portion of the first protruding portion 430 may be non-overlapped with the first opening 110 of the first substrate 100 in the optical axis direction.

The camera module 10 may include a base 500. The base 500 may be coupled to the support member 400. The second connector 700 may be coupled to the base 500. The base 500 may be penetrated by the second connector 700. The second substrate 800 may be coupled to the lower surface of the base 500. A second driving unit 600 may be disposed on an upper surface of the base 500. The base 500 may include a third opening 510, a first groove 540, a second groove 530, and a coupling portion 520.

The third opening 510 may be formed in a central region of the base 500. The third opening 510 may be overlapped with the image sensor 900 in the optical axis direction. The third opening 510 may include an opening. The third opening 510 may include a hole.

The first groove 540 may be formed to be concave on an upper surface of the base 500. The second driving unit 600 may be coupled to the first groove 540. The height of the first groove 540 may be formed smaller than the height of the second driving unit 600. The first grooves 540 may be formed in the number and shape corresponding to the second driving unit 600. The first groove 540 may be disposed adjacent to the edge of the base 500. The first groove 540 may include a plurality of first grooves 540. The first groove 540 may include four first grooves 540. Each of the four first grooves 540 may be disposed at the corners of the base 500.

The second groove 530 may be formed to be concave at a lateral surface of the base 500. The second groove 530 may be formed to be concave in a central region of the lateral surface of the base 500. The second groove 530 may be non-overlapped with the first groove 540 in the optical axis direction. The second groove 530 may include four second grooves 530. The coupling portions 520 may be disposed in the two second grooves 530, respectively. A second connector 700 may be disposed in a region adjacent to the remaining two second grooves 530.

The coupling portion 520 may be formed on the lateral surface of the base 500. The coupling portion 520 may be disposed in the second groove 530. The height of the coupling portion 520 may be formed larger than the height of the base 500. The upper end of the coupling portion 520 may be formed in a hook shape. The coupling portion 520 may be coupled to the support member 400. The coupling portion 520 may be coupled to the first protruding portion 430 of the support member 400. The coupling portion 520 may be hook-coupled to the first protruding portion 430 of the support member 400. The coupling portion 520 may include two coupling portions, but is not limited thereto and may be formed in a number corresponding to the number of the first protruding portions 430.

The camera module 10 may include a second driving unit 600. The second driving unit 600 may be disposed on the base 500. The second driving unit 600 may be disposed on the upper surface of the base 500. The second driving unit 600 may be coupled to the first groove 540 of the base 500. The second driving unit 600 may be formed in a shape corresponding to the first groove 540 of the base 500. The height of the second driving unit 600 may be larger than the height of the first groove 540. The second driving unit 600 may face the first driving unit 200. The second driving unit 600 may move the base 500 through an electromagnetic interaction with the first driving unit 200. Through this, the optical axis between the image sensor 900 and the lens module 1000 may be aligned. The second driving unit 600 may include a plurality of second driving units 600. The second driving unit 600 may include four second driving units 600. Each of the four second driving units 600 may be disposed adjacent to each corner of the base 500. The second driving unit 600 may include a magnet. Through this, even if a separate current is not supplied to the second driving unit 600, an electromagnetic interaction with the first driving unit 200 can be performed. As a modified embodiment, the first driving unit 200 may include a magnet and the second driving unit 600 may include a coil.

The camera module 10 may include a second connector 700. The second connector 700 may be disposed on the base 500. The second connector 700 may penetrate through the base 500. One end of the second connector 700 may be electrically connected to the first connector 300 and the other end may be electrically connected to an upper surface of the second substrate 800. That is, the second connector 700 may electrically connect the second substrate 800 and the first connector 300. The second connector 700 may be formed of an elastic material. The second connector 700 may be formed of an electrically conductive material. The second connector 700 may be bent at least once. In the embodiment of the present invention, the second connector 700 is bent once above the base 500 and bent once below the base 500, but is not limited thereto. The second connector 700 may be disposed in a region adjacent to the long side of the image sensor 900. The second connector 700 may be disposed in a region adjacent to the second groove 530 of the base 500. The second connector 700 may be disposed to be spaced apart from the coupling portion 520 of the base 500. The second connector 700 may be disposed between two adjacent second driving units 600.

The second connector 700 may include a plurality of second connection terminals. The plurality of second connection terminals may be spaced apart from one another. A first connection terminal of the first connector 300 may be disposed between the plurality of second connection terminals. Each of the plurality of second connection terminals may be electrically connected to each of the plurality of first connection terminals of the first connector 300. Some of the plurality of second connection terminals may be disposed adjacent to one side of the long side of the image sensor 900, and the rest may be disposed adjacent to the other side of the long side of the image sensor 900. Some of the plurality of second connection terminals and the rest of the plurality of second connection terminals are formed in a shape corresponding to each other, and are disposed at positions corresponding to each other based on a central region of the base 500, may be formed in the same number as each other.

The camera module 10 may include a second substrate 800. The second substrate 800 may be disposed below the base 500. The second substrate 800 may be coupled to a lower surface of the base 500. The image sensor 900 may be mounted on the second substrate 800. The second substrate 800 may be electrically connected to the second connector 700. The second substrate 800 may be electrically connected to the first substrate 100 through the first and second connectors 300 and 700.

The camera module 10 may include an image sensor 900. The image sensor 900 may be overlapped with the first opening 110, the second opening 420, the third opening 510, and the lens module 1000 in the optical axis direction. The image sensor 900 may perform a function of converting light that has passed through the lens module 1000 into image data. More specifically, the image sensor 900 may convert light into an analog signal through a pixel array comprising a plurality of pixels, and generate image data by synthesizing a digital signal corresponding to the analog signal.

The image sensor 900 may include a lens module 1000. The lens module 1000 may be disposed on the first substrate 100. The lens module 1000 may be overlapped with the first opening 110 of the first substrate 100 in the optical axis direction. As illustrated in FIG. 7, the lens module 1000 may include a second protruding portion 1010, a lens holder 1100, a first lens unit 1200, a second lens unit 1300, and a liquid lens unit 1400.

The second protruding portion 1010 may be formed to protrude outward from the outer surface of the lens holder 1100. The second protruding portion 1010 may be formed in a square plate shape. The second protruding portion 1010 may be coupled to an upper surface of the first substrate 100. The second protruding portion 1010 may be coupled to a region among the upper surface of the first substrate 100 adjacent to the first opening 110. The second protruding portion 1010 may be coupled to the first hole 120 of the first substrate 100. For example, a protrusion formed on a lower surface of the second protruding portion 1010 may be inserted into the first hole 120, and the second protruding portion 1010 may be adhered or fused to an upper surface of the first substrate 100 through the first hole 120.

The lens module 1000 may include a lens holder 1100. The lens holder 1100 may be coupled to an upper surface of the first substrate 100. The lens holder 1100 may include a first lateral surface 1102 having a first opening, and a second lateral surface 1104 having a second opening facing the first opening in a direction perpendicular to the optical axis direction. The lens holder 1100 may include a through hole in which an upper portion and a lower portion thereof are open, and the first lens unit 1200, the liquid lens unit 1400, and the second lens unit 1300 may be disposed in the through hole formed inside the lens holder 1100. The first lens unit 1200 and the second lens unit 1300 may be solid lens units. The first lens unit 1200 may be coupled to an upper hole formed above the lens holder 1100, and the second lens unit 1300 may be coupled to a lower hole formed below the lens holder 1100. The liquid lens unit 1400 may be disposed and coupled to a first aperture and/or a second aperture positioned between the upper hole and the lower hole, or may be disposed and coupled between the first and second apertures. Light incident on the first lens unit 1200 from the outside of the camera module 10 may pass through the liquid lens unit 1400 and enter the second lens unit 1300. The first lens unit 1200 may include a first lens. The second lens unit 1300 may include a second lens.

The lens module 1000 may include a first lens unit 1200 and a second lens unit 1300. The first lens unit 1200 may be disposed in an upper hole of the lens holder 1100. The second lens unit 1300 may be disposed in a lower hole of the lens holder 1100. The first lens unit 1200 and the second lens unit 1300 may include at least one lens.

An exposure lens (not shown) may be provided in front of the first lens unit 1200, and a cover glass may be disposed in front of the exposure lens. Since the exposure lens protrudes to the outside of the lens holder 1100, it may be exposed to the outside and damage the surface. If the surface of the lens is damaged, the image quality of the image photographed by the camera module 10 may be deteriorated. Therefore, in order to inhibit and suppress surface damage of the exposed lens, a cover glass is disposed, a coating layer is formed, or a method of configuring an exposed lens with a wear-resistant material having a higher rigidity than that of a lens constituting the first lens unit 1200 or the second lens unit 1300 may be applied so as to inhibit the surface damage of the exposed lens.

The lens module 1000 may include a variable focus lens. The variable focus lens may be a lens whose focus is variable according to the application of current and/or voltage. The variable focus lens may include a liquid lens 1420. The lens module 1000 may include a liquid lens unit 1400. The liquid lens unit 1400 may be disposed on the lens holder 1100. The liquid lens unit 1400 may be inserted or disposed in the first opening or the second opening formed in the side walls 1102 and 1104 of the lens holder 1100. The liquid lens unit 1400 may include an individual electrode connection substrate 1410, a liquid lens 1420, a spacer 1430, and a common electrode connection substrate 1440.

The individual electrode connection substrate 1410 may electrically connect the individual electrodes of the liquid lens unit 1400 to the first substrate 100. The individual electrode connection substrate 1410 may be implemented as an FPCB. The liquid lens 1420 may include a plurality of plates formed to accommodate two different liquids.

The spacer 1430 may be coupled while surrounding the liquid lens 1420, and may protect the liquid lens 1420 from external impact. In addition, the spacer 1430 may be in contact with the gripper during insertion into the lens holder 1100 or during active alignment.

The common electrode connection substrate 1440 may electrically connect the common electrode of the liquid lens unit 1400 to the first substrate 100. The common electrode connection substrate 1440 may be implemented as a flexible circuit board (FPCB) or a single metal substrate (conductive metal plate), and may be implemented as a metal substrate comprising an insulating layer at least in some regions except: a pad exposed at a position corresponding to the common electrode of the liquid lens 1420; and a pad exposed at a position corresponding to a pad for a common electrode of the first substrate 100.

The common electrode connection substrate 1440 and the individual electrode connection substrate 1410 may be bent toward the first substrate 100, respectively. The individual electrode connection substrate 1410 may be electrically connected to electrode pads formed on the first substrate 100 through connection pads electrically connected to each of the individual electrodes. The connection pad and the electrode pad may be electrically connected by conductive epoxy or soldering, but are not limited thereto.

Likewise, the common electrode connection substrate 1440 may be electrically connected to an electrode pad formed on the first substrate 100 through a connection pad electrically connected to the common electrode.

Here, the electrode pads connected to the common electrode connection substrate 1440 and the individual electrode connection substrate 1410 may be defined as a first pad member and a second pad member, respectively, and the first pad member and the second pad member may be disposed in a direction away from the element disposed on the first substrate 100 at the center of the liquid lens.

The interface between the conductive liquid and the non-conductive liquid is deformed by the driving voltage applied through the common electrode connection substrate 1440 and the individual electrode connection substrate 1410, so that the curvature and/or focal length of the liquid lens unit 1400 may be changed. When the deformation of the interface and the change of curvature are controlled, the liquid lens unit 1400, the camera module 10 comprising the same, and the optical device have an auto-focusing (AF) function, hand shake correction or optical image stabilization (OIS) functions, and the like can be performed.

FIGS. 8 to 11 are views illustrating a process of assembling some components of a camera module according to an embodiment of the present invention.

Figure 8:
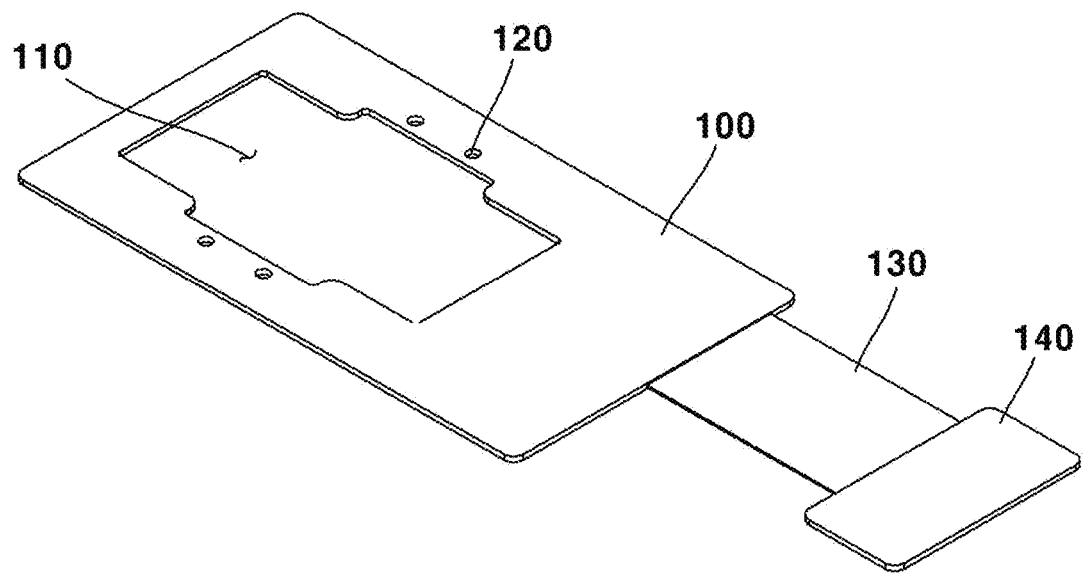
FIGS. 8 to 11 are views illustrating a process of assembling some components of a camera module according to an embodiment of the present invention.
Figure 9:
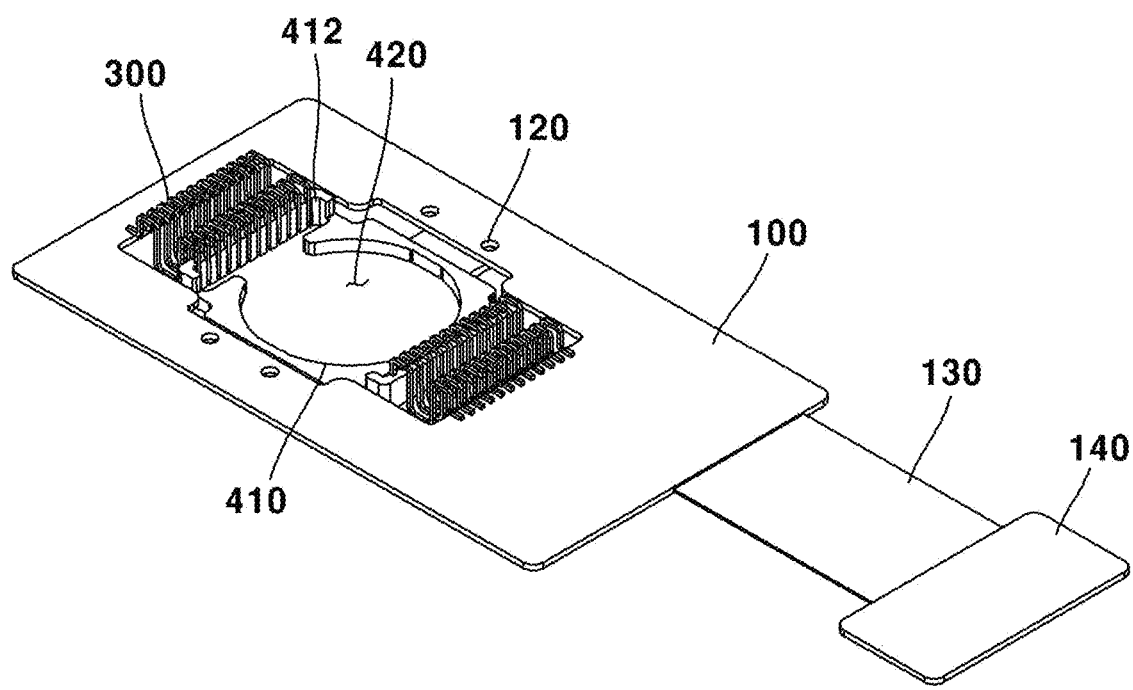

Referring to FIGS. 8 and 9, the support member 400 is coupled to the first substrate 100. At this time, surface mounting technology (SMT) may be applied. In this case, the first connector 300 may be fixed and coupled to the upper surface of the first substrate 100, and the support member 400 may be disposed below the first opening 110.

Figure 10:
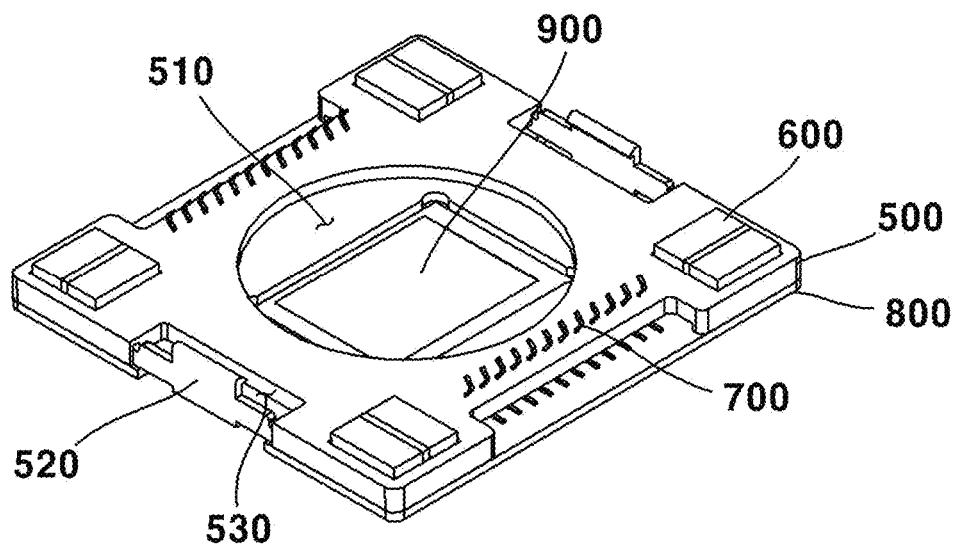
Figure 11:
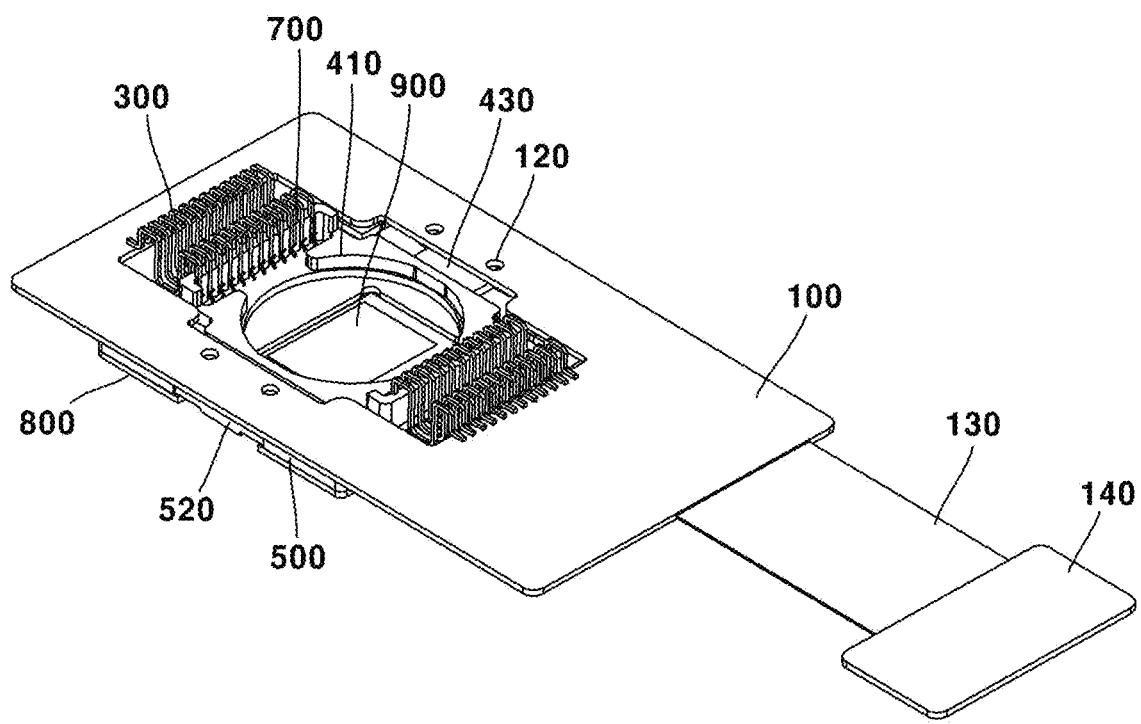

Referring to FIGS. 10 and 11, the base 500 to which the second substrate 800 is assembled is coupled to the support member 400 coupled to the first substrate 100. At this time, the coupling portion 520 of the base 500 is hook-coupled to the first protruding portion 430 of the support member 400, and the second connector 700 is electrically connected to the first connector 300.

That is, according to the camera module 10 according to an embodiment of the present invention, there is an advantage in that since the assembly process between components can be simplified, manufacturing is easy and the product can be miniaturized.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. A sensor driving device comprising:
a fixing portion comprising a first substrate;
a moving portion comprising a second substrate spaced apart from the first substrate, and an image sensor electrically connected with the second substrate;
a first driving unit disposed on the fixing portion;
a second driving unit disposed on the moving portion and facing the first driving unit; and
a connector electrically connecting the first substrate and the second substrate,
wherein the connector elastically connects the fixing portion and the moving portion so that the moving portion is movable in a direction perpendicular to an optical axis direction,
wherein the connector comprises a first connector coupled to the first substrate and a second connector coupled to the second substrate,
wherein the first connector and the second connector are coupled to each other,
wherein the first substrate comprises a first opening,
wherein the moving portion comprises a support member disposed at a position corresponding to the first opening, and
wherein the first connector connects the first substrate and the support member.

2. The sensor driving device of claim 1, wherein the moving portion comprises a base disposed on the second substrate, and
wherein the second connector connects the second substrate and the base.

3. The sensor driving device of claim 2, wherein the first driving unit comprises a coil,
wherein the second driving unit comprises a magnet,
wherein the coil is disposed on the first substrate, and
wherein the magnet is disposed on the base.

4. The sensor driving device of claim 1, wherein the connector comprises a first portion coupled to the fixing portion, and
wherein the first portion of the connector is disposed at a position higher than a lower end of the connector and lower than an upper end of the connector.

5. The sensor driving device of claim 4, wherein the connector comprises a second portion bent from the first portion and extending in the optical axis direction.

6. The sensor driving device of claim 5, wherein the connector comprises a third portion bent from the second portion and extending in the direction perpendicular to the optical axis direction, and a fourth portion bent from the third portion and extending in a direction opposite to an extending direction of the second portion.

7. The sensor driving device of claim 1, wherein the connector comprises a plurality of portions disposed in the optical axis direction and spaced apart from each other in the direction perpendicular to the optical axis direction.

8. The sensor driving device of claim 1, wherein the first connector is bent at least once.

9. The sensor driving device of claim 1, wherein the first connector is overlapped with the first substrate at least three times in the direction perpendicular to the optical axis direction.

10. The sensor driving device of claim 1, wherein the support member comprises a support portion, a second opening formed on a central region of the support portion and overlapped with the image sensor in the optical axis direction, an extension portion extending from a first lateral surface of the support portion and a third lateral surface opposite to the first lateral surface, and a first protruding portion extending from a second lateral surface of the support portion and a fourth lateral surface opposite to the second lateral surface.

11. The sensor driving device of claim 10, wherein a height of the extension portion is greater than a height of the support portion,
wherein a space is formed between the extension portion and the first and third lateral surfaces of the support portion, and
wherein the first connector is coupled to an inner lateral surface of the extension portion.

12. The sensor driving device of claim 10, wherein the moving portion comprises a base disposed on the second substrate,
wherein the base comprises a coupling portion formed on a lateral surface of the base, and
wherein the coupling portion is hook-coupled to the first protruding portion.

13. The sensor driving device of claim 10, wherein the support portion and the first protruding portion are disposed below the first substrate, and
wherein a portion of the extension portion is overlapped with the first substrate in the direction perpendicular to the optical axis direction.

14. The sensor driving device of claim 1, wherein the connector comprises twenty four connectors spaced apart from each other.

15. A sensor driving device comprising:
a first substrate;
a second substrate spaced apart from the first substrate, a base disposed on the second substrate, and an image sensor electrically connected with the second substrate;
a first driving unit disposed on the first substrate;
a second driving unit disposed on the base and facing the first driving unit; and
a connector electrically connecting the first substrate and the second substrate,
wherein the connector elastically connects the first substrate and the second substrate so that the image sensor is movable in a direction perpendicular to an optical axis direction,
wherein the connector comprises a first connector coupled to the first substrate and a second connector coupled to the second substrate,
wherein the first connector and the second connector are coupled to each other, and
wherein the first connector is overlapped with the first substrate at least three times in the direction perpendicular to the optical axis direction.

16. The sensor driving device of claim 15, wherein the first connector is bent at least once.

17. A camera module comprising:
a fixing portion comprising a first substrate;
a moving portion comprising a second substrate spaced apart from the first substrate, and an image sensor electrically connected with the second substrate;
a lens disposed above the image sensor;
a first driving unit disposed on the fixing portion;
a second driving unit disposed on the moving portion and facing the first driving unit; and
a connector electrically connecting the first substrate and the second substrate,
wherein the connector elastically connects the fixing portion and the moving portion so that the moving portion is movable in a direction perpendicular to an optical axis direction,
wherein the connector comprises a first connector coupled to the first substrate and a second connector coupled to the second substrate,
wherein the first connector and the second connector are coupled to each other, and
wherein the first connector is overlapped with the first substrate at least three times in the direction perpendicular to the optical axis direction.

18. The camera module of claim 17, comprising a liquid lens overlapped with the lens and the image sensor in the optical axis direction.

* * * * *